Nov. 13, 1928.

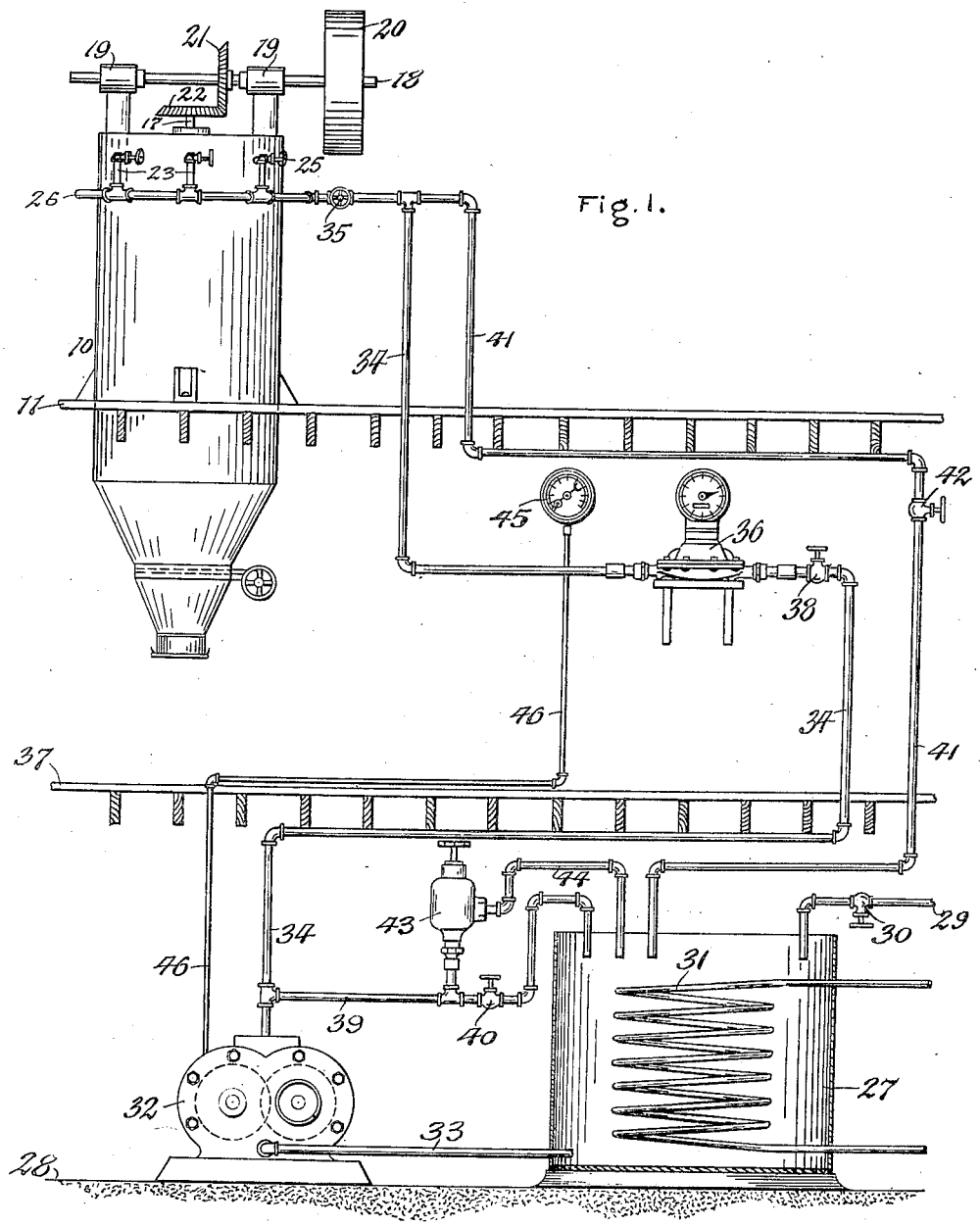

L. TRUE 1,691,535

APPARATUS FOR MIXING DRY AND LIQUID MATERIALS

Filed Feb. 23, 1928

Inventor
Lionel True
By Popps Towers
Attorneys

Patented Nov. 13, 1928.

1,691,535

UNITED STATES PATENT OFFICE.

LIONEL TRUE, OF SPRINGVILLE, NEW YORK.

APPARATUS FOR MIXING DRY AND LIQUID MATERIALS.

Application filed February 23, 1928. Serial No. 256,174.

This invention relates to material mixing-apparatus and aims to provide improved appliance means for mixers whereby molasses for example may be mixed thoroughly with dry pulverulent stock feeds so as to render the mixture more palatable and increase the food value thereof to stock and poultry.

It has heretofore been the custom in stock-feed plants to employ one form of apparatus for mixing the dry food materials and another apparatus for mixing molasses or other liquid food with the dry food materials. This practice is objectionable because of the expense incident to the double equipment and the increased floor space necessarily given up to installation of two different mixing apparatuses of the stated character.

The object of this invention is to provide means whereby the mixing of molasses or other liquids with dry food stocks may be effected in the apparatuses which have heretofore been used solely for mixing dry feeds, thereby reducing the cost of plant installations for mixing dry food products with molasses or other liquid and still permitting use of the same machine for producing dry food mixtures only, while also allowing a considerable saving in space heretofore required for manufacturing both of these products.

The invention will be best understood upon further description with reference to the accompanying drawings wherein a practical embodiment thereof is shown in application to a mixing-device of conventional type.

In said drawings:—

Figure 1 is an elevation partly in section illustrating a dry feed and molasses mixing plant embodying this invention.

Similar characters of reference indicate like parts in the several views of the drawings:—

Figure 3:
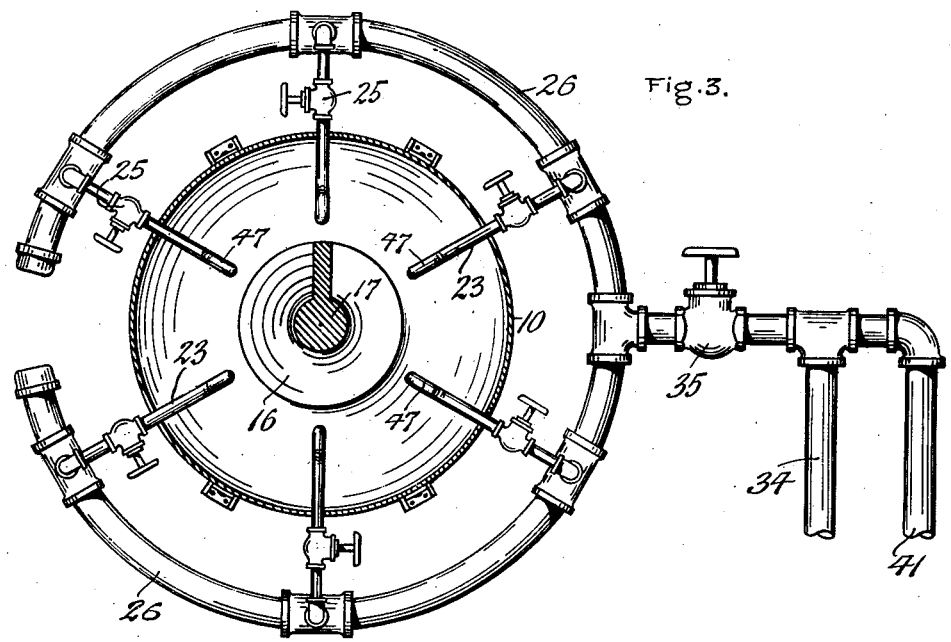
Fig. 3 is a plan view of a part of the appliance taken on the line 3—3 of Fig. 2.

The invention may be used in application to various kinds of apparatus suitable for mixing dry feeds and the particular form of mixing apparatus shown in the accompanying drawings and which will be hereinafter more fully described is to be regarded as merely typical of one apparatus suitable for this purpose.

In its general organization, the preferred form of mixing apparatus comprises an upright body 10 represented as mounted in one of the upper floors 11 of a building and forming a mixing chamber having an upper cylindrical part 12 and a lower conical part 13. The top of this chamber is open to permit dry feed to be introduced readily thereinto, which feed, in the case of stock products, may consist of a mixture of various kinds of pulverulent materials such as middlings, ground oats, corn meal and the like.

While the mixing of materials within this chamber is going on, the lower end of the chamber is closed by a valve or slide 14 movable transversely across the conical part of the chamber adjacent the lower end thereof, and when the mixing of materials has been completed, the aforesaid valve is opened so as to permit the material to drop upon a subjacent discharge valve or slide 15 which is movable into and out of operative position across the lower part of the conical outlet of the mixing chamber, whereby the material is permitted to discharge into bags or other receptacles for receiving the same.

After a batch of dry material has been placed within the mixing chamber, it is agitated or turned over continuously in order to thoroughly and uniformly mix the several ingredients together, this being effected preferably by an upright screw conveyor 16 arranged centrally of the mixing chamber and carried by an upright shaft 17 which may be rotated by various means. Suitable means for example is provided by a horizontal driving shaft 18 shown journaled in bearings 19 on the upper part of the mixing chamber and having a driving pulley 20 for receiving the drive belt from a power unit or shaft (not shown). Said driving shaft carries a beveled gear 21 intermeshing with a similar gear 22 on the upper end of the aforesaid conveyor shaft 17 (see Fig. 1) for imparting rotation to the latter.

In operation of this mixing apparatus, the rotating screw conveyor 16 serves to continuously lift portions of the dry feed materials in the central part of the mixing chamber and throw the same off laterally at the top toward the wall of the chamber and over the mass of intermixing materials therein, whereupon the materials will descend by gravity through the annular space between said conveyor and the surrounding wall of the chamber until it again reaches the lower end of the conveyor and is again picked up, elevated and thrown off, this lifting and descending operation being continuous while the machine is in operation to thereby effect a thorough commingling and uniform distribution of the materials throughout the entire mass.

According to this invention, molasses or other liquid materials may be fed into the mixing chamber at the upper end thereof and at different points spaced circumferentially between the conveyor and the wall of the chamber, so that during the operation of mixing dry feed materials, the molasses or other liquid will be introduced thereinto in relatively small quantities at different points, thus assuring a fine distribution of the molasses throughout the mass of dry feed without occasioning or permitting the formation of any lumps of the feed, such as would be liable to occur if a considerable amount of the molasses or liquid of a sticky or viscous character were delivered into the dry feed at any one or concentrated point.

Although the invention comprehends various arrangements and changes in structural detail of appliance means for feeding molasses or other liquid materials into dry pulverulent materials within the mixing chamber, the preferred embodiment, construction and arrangement of parts will now be described as follows:—

A plurality of branch discharge pipes 23 are shown arranged in an annular row around the upper part of the mixing chamber, each of said pipes being extended radially through the wall of the chamber and terminating with a downwardly turned nozzle 24 between the wall of the chamber and the aforedescribed screw conveyor. In the illustrative construction, there are six of these delivery pipes with nozzles, but this number may be increased or decreased to suit the requirements of any particular installation or the character of the material to be mixed. Each of the delivery pipes is of comparatively small diameter so that the liquid discharged through the nozzle thereof enters the dry feed or material in a very fine stream or jet or else in drops rather than in a heavy stream, and the amount of liquid thus discharged is regulatable by means of a valve 25 arranged in each pipe outside the mixing chamber.

The several branch delivery pipes are connected at their outer ends with a manifold pipe 26 which in the present instance is in the form of a crescent-shaped pipe encircling the mixing chamber.

The liquid to be mixed with the dry materials, such as molasses for example, is supplied from a reservoir tank 27 which may be located on a lower floor 28 of the building, said tank being supplied from any suitable source through a pipe 29 having a regulating valve 30.

As molasses and similar viscous liquids flow very sluggishly except when at high temperature, means are provided for heating the same to make it more limpid or freely flowable for supply to the materials under mixing process, this being particularly necessary during winter or cold weather when the molasses becomes quite stiff and forcible through the piping only under excessive pressure. While various means may be employed for heating or warming the molasses, the means preferred consists of a coil 31 arranged in the reservoir tank through which any heating agent such as hot water, steam, hot air and the like may be passed for the purpose of heating the liquid to free-fluent temperature. The same result could of course be attained by the use of an electric heating unit or other heating apparatus capable of imparting high heat to the liquid.

For the purpose of drawing the molasses or other liquid from the reservoir tank, a pump 32 is provided, the same being preferably of the gear type so as to forcibly move the molasses, and said pump having its inlet connected with the lower part of said tank by means of a pipe 33 while its outlet is connected with the manifold pipe 26 by means of a delivery pipe 34. This delivery pipe is preferably provided with a main controlling valve 35 located close to the aforesaid manifold for cutting off the liquid supply thereto when desired.

At a point intermediate the ends of this main delivery pipe, a meter 36 is interposed for measuring the amount of molasses or other liquid supplied to the mixing chamber, said meter being of any approved type or construction and preferably located between a second floor 37 and the next upper floor 11 of the building, so that it may be observed by the operator who discharges the finished product from the mixing chamber into bags or other containers. For the latter purpose, the lower end of the chamber is extended downwardly through the upper floor so that its discharge funnel 13 is located between the floors 37 and 11, as shown in Fig. 1.

In advance of the aforesaid meter, a regulating valve 38 is arranged in the main delivery pipe for regulating the amount of liquid or molasses flowing through the meter to the manifold pipe and its distributing pipes 23 in accordance with desire or requirements.

When starting the apparatus, the flow of molasses through the main delivery pipe to the distributing pipes is apt to be very sluggish owing to the stiff condition of the molasses, this being particularly pronounced during the winter time or in cold weather.

It has therefore been found desirable and in some instances necessary to cause the pump during initial operation to draw molasses from the tank and immediately return it thereto without attempting to force any part of the molasses to the distributing pipes and into the mixing chamber. For this purpose a primary return pipe 39 is provided, one end of which connects with the main delivery pipe 34 at a point immediately adjacent the latter's connection with the pump, while the opposite end thereof opens into the top of the reservoir tank. At an intermediate point in said return pipe, a valve 40 is provided for opening and closing the same.

In addition to this primary return pipe, a main return pipe 41 is shown with one end connected with the main delivery pipe 34 at a point just preceding the control valve 35, and its opposite end opening into the top of the liquid reservoir tank. At an intermediate point therein proximate to the aforesaid meter 36, a controlling valve 42 is provided within convenient reach of the attendant in this part of the building.

An automatic relief or safety-valve 43 is also provided in the circuit with its inlet connecting with the outlet side of the pump. In this instance, the inlet of said safety valve is preferably connected with the primary return pipe 39 between the pump and valve 40, while the outlet of said relief-valve opens through the medium of a discharge pipe 44 into the upper end of the reservoir tank, as shown in Fig. 1. The pressure under which molasses or other liquid is being forced by the pump to the mixing chamber may be observed by the attendant while occupied with packing the finished material into bags or packages, this being made possible by providing a pressure gage 45 adjacent the meter 36 and connecting the same with the outlet side of the pump by a pipe 46 as shown in Fig. 1.

The operation of the mixing apparatus is as follows:—

Assuming that a sufficient quantity of molasses or other food liquid has been supplied to the reservoir tank and therein heated or warmed to the desired temperature by the heating coil, and that a batch of drystock feeds of the desired ingredients has been introduced into the mixing chamber so that these ingredients are under mixing process by rotation of the lifting screw conveyor, the operator opens the valve 40 in the primary return pipe and closes the valve 42 in the main return pipe and also the valves 35 and 38 in the main delivery line, whereupon he starts the pump. As a result of these preliminary adjustments of parts of the apparatus, the pump will draw the molasses from the tank and immediately return it thereto through the primary return pipe 39, but owing to the stiffness of the molasses or liquid left in the piping from previous operations, some resistance to the work of the pump will be encountered, which resistance will be evidenced by an indication of pressure above normal on the gage 45 which communicates with the outlet side of the pump as hereinbefore stated.

After the pump has run for a short time and the stiff or heavy molasses or fluid in the piping (including the primary return pipe) has been forced out and replaced by some of the heated and more limpid molasses from the tank, this pressure in the piping (including the primary return pipe) is reduced and consequently a reduction of pressure at the outlet side of the pump will occur and be indicated on said pressure gage. As soon as a free flow of molasses or liquid from the pump through the primary return pipe 39 is obtained, the operator closes the valve 40 in said primary return pipe and opens the valve 38 in the main delivery pipe and also the valve 42 in the secondary or main return pipe 41.

During the interim between closing the valve 40 and opening of the valves 38 and 42, the pressure of the pump will cause the relief valve 43 to open automatically and permit the liquid under pressure to return from the pump to the tank.

The pump now encounters the resistance of the non-limpid or stiff molasses present in the main delivery pipe between the primary delivery pipe 39 and the valve 35 and also in the main return pipe 41 between said valve and its lower or outlet end.

Consequently the pressure again builds up in the piping connected with the outlet side of the pump. This increased pressure is observable by the attendant on the pressure gage 45 and continues until the pump has cleared out the stiff or non-limpid molasses or other liquid present in these parts of the circuit by discharging the same into the tank and replacing it with more limpid and free-flowing molasses or liquid forced therethrough by the pump.

When the stiff or sluggish molasses has been removed from the main discharge pipe and main return pipe (which may be determined by observation of the gage 45) the attendant then closes the valve 42 in the main return pipe and opens the valve 35 in the outlet end of the main delivery pipe, so that the free-flowing or limpid molasses may now enter the manifold pipe 26 and pass therefrom through the several branch distributing pipes 23 for discharge into the upper part of the mixing chamber, where it emerges either in the form of fine streams or jets or in a succession of drops entering the body of dry feed materials under mixing process.

By this means the molasses or other liquid is discharged into the feed in comparatively small quantities at a time and at various points above the body of dry material while the latter is being agitated within the mixing chamber.

It therefore follows that a light and uniform distribution of molasses is effected throughout the entire mass of dry material so that the latter when thoroughly mixed together will still be in a loose and pulverulent condition notwithstanding that the multiplicity of minute particles of dry material are individually coated with fine films of molasses and are therefore in the most desirable condition for feeding to stock or poultry.

If the free discharge of the liquid through the outlet of the pump should at any time be obstructed to such an extent that back pressure is liable to occur on the pump or subject the piping to undue strain, the relief valve 43 will automatically open to afford relief under such conditions, thus permitting the fluid under pressure from the pump to escape through the by-pass pipe or relief pipe 44 back into the reservoir tank 27. Such excess pressure is liable to occur if the outlet portion of the primary relief pipe 39 is closed or partially obstructed by stiff molasses, also by the presence of stiff molasses in the main delivery pipe and the main return pipe or when the main control valve 35 is closed after the mixing of a batch of material with molasses has been completed. This relief valve therefore operates as a safety means for permitting the molasses or liquid to flow from the outlet side of the pump back into the tank without producing any injurious results. The building up of such pressure will be indicated on the pressure gage 45 which may be noted by the attendant and therefore serves as a warning that the pump should either be shut down or that the valve 42 in the main return pipe should be opened whenever the main discharge valve 35 has been temporarily closed during periods of rest between successive operations of mixing batches of material.

By thus gradually clearing out the pipe extending from the pump to the mixing chamber, it is possible to run the pump by means of a motor of lower capacity than would otherwise be necessary, especially if the entire pipe resistance would need to be overcome by the pump during initial operation. Considerable economy in installation and maintenance of the apparatus is accordingly made possible.

In addition to the structural simplicity of the mixing apparatus, it is not liable to get out of order and operates efficiently with any suitable form of dry feed mixing apparatus for adding molasses or other liquids thereto in the manner described, thereby producing a product which is of uniform consistency throughout and in which the several ingredients are thoroughly and uniformly mixed and distributed so as to be in the most desirable condition for use as stock or poultry feed.

Figure 2:
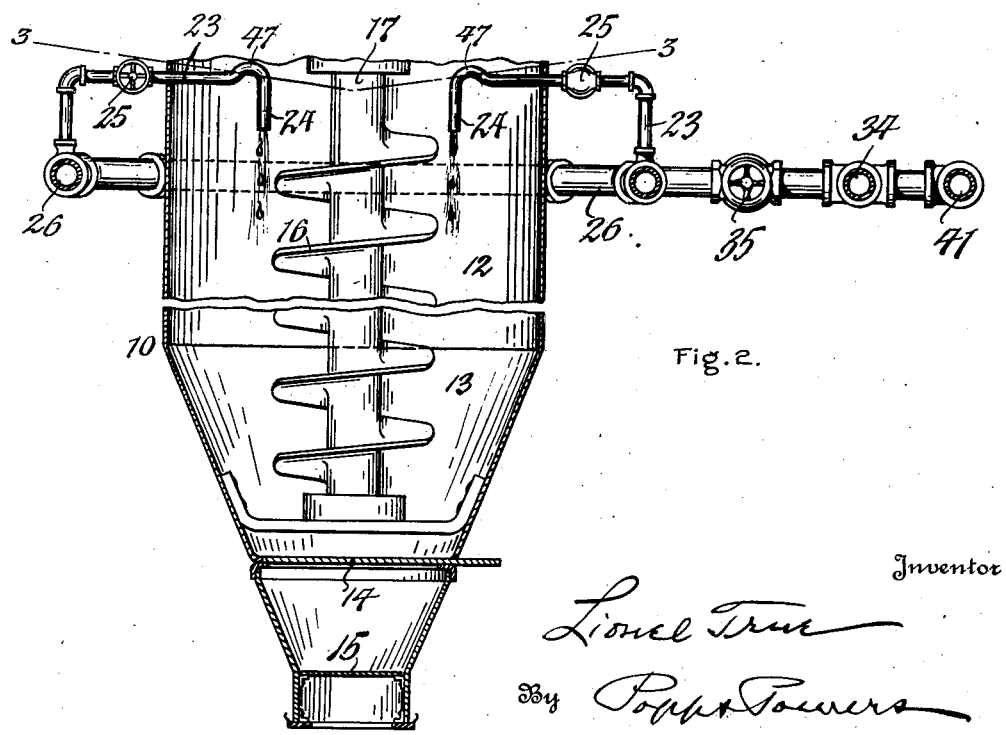
Figure 2 is a fragmentary vertical section of the mixing chamber and associated parts on enlarged scale.

In absence of provision to avoid it, any molasses remaining in the distributing pipes 23 would continue to drip into the mixing chamber after the pump had been cut off. Such dripping is prevented by elevating the delivery ends of said pipes slightly above their outer ends, this being accomplished for example by making a slight upward bend in each pipe to provide an off-set 47 immediately above its discharge nozzle, as shown in Fig. 2. By this means, any molasses remaining in the distributing pipes will be prevented from dripping into the mixing chamber when the feed of molasses under pump pressure has ceased.

I claim as my invention:—

1. An apparatus of the character described comprising in combination with a mixing chamber having means therein for mixing dry pulverulent materials; means for distributively supplying liquid to the interior of the chamber for mixture with the dry materials mixing therein, said means including a plurality of delivery nozzles discharging into different parts of said chamber from points above the materials under mixing operation, a reservoir tank for liquid to be supplied through said nozzles, a pump for forcing the liquid from said tank to the nozzles, and means for heating the liquid in the tank.

2. An apparatus of the character described comprising in combination with a mixing chamber having means therein for mixing dry pulverulent materials; means for distributively discharging liquid into the dry materials during the mixing operation within said chamber, said means including a plurality of delivery nozzles discharging into different parts of the chamber from points above the mixing materials, a reservoir tank for liquid to be supplied through said nozzles, a pump having inlet and outlet pipe connections with said tank and nozzles respectively, a return pipe connection between the outlet pipe of the pump and said tank, a valve in said return pipe, and a valve in said outlet pipe between said nozzles and its point of connection with the return pipe.

3. An apparatus of the character described comprising in combination with a mixing chamber having means therein for mixing dry pulverulent materials; a delivery nozzle opening into said chamber above the mixing space thereof, a liquid supply tank; a pump having inlet pipe connection with said tank and outlet pipe connection with said nozzle, a control valve in the outlet pipe of the pump, a return pipe connecting with said outlet pipe at a point in advance of said control valve in the latter and said return pipe opening into the tank, a control valve in said return pipe, a relief pipe connection between said outlet pipe and tank at a point adjacent the former's connection with the pump, and a relief valve in said relief pipe.

4. An appliance apparatus of the character described comprising in combination with a mixing chamber having means for mixing dry and liquid materials; a valve controlled liquid delivery nozzle opening into said chamber, a liquid supply tank, a pump having inlet pipe connection with said tank and outlet pipe connection with said nozzle, a control valve in said pump outlet pipe near its connection with said nozzle, a return pipe connecting said outlet pipe with the tank and containing a valve, a relief pipe connecting with said outlet pipe in advance of the latter's connection with said return pipe and opening into said tank, a relief valve in said relief pipe, and a meter in said outlet pipe between its point of connection with the relief pipe and nozzle, said outlet pipe being also provided with a valve between said meter and said relief pipe.

5. An apparatus of the character described, comprising in combination with a mixer; means for discharging liquid into said mixer including nozzle pipes relatively arranged at the top of the mixer and each having an arched outlet portion elevating above the inlet portion thereof to prevent escape of liquid therethrough when the liquid supply thereto is shut off.

6. An apparatus of the character described, comprising a mixing chamber having means therewithin for mixing stock-feed materials, together with a plurality of means arranged substantially concentric relatively to the cylindrical walls of the chamber for discharging molasses or saccharine liquid in small quantities into the materials at different points thereabove and substantially intermediate the wall and axis of the chamber during the mixing operation therein.

7. In combination with a mixing chamber having means therein for mixing stock-feed materials, means for introducing heated molasses or saccharine liquid into said chamber during the mixing operation; the latter means comprising a source of liquid supply, means for heating the liquid, liquid distributing means within said chamber, a feed pipe connecting said source with said distributing means, a valve in said feed pipe controlling the flow of liquid into said distributing means, a return pipe connecting said feed pipe adjacent said chamber with said source of supply, and a valve in said return pipe controlling the passage of liquid therethrough, whereby the heated liquid may be caused to circulate through said feed and return pipes to remove cold molasses therefrom preliminarily to introducing the liquid in said chamber.

8. An apparatus of the character described comprising a mixing chamber having means therein for mixing stock-feed materials, means for introducing molasses or saccharine liquid into the materials during the mixing operation within the chamber; the latter means comprising a liquid supply tank, means for heating the liquid in said tank, a pump having its inlet connected with said tank and its outlet connected with a feed pipe arranged to discharge liquid into said chamber, a return pipe connecting the delivery side of said feed pipe with said tank, and valves controlling the flow of liquid through said pipes, whereby heated liquid may be caused to circulate through the feed and return pipes for removing cold molasses adhering to the interior thereof before introducing the liquid into the mixing chamber.

9. In combination with a mixing chamber having means therein for mixing dry feed materials, a liquid feeding attachment comprising a tank, means for heating the liquid in said tank, a pump, a feed pipe connecting the inlet to said pump with said tank and its outlet with said mixing chamber, distributing means extending into said chamber connected to said feed pipe, a valve in said pipe controlling the flow of liquid to said distributing means, and a return pipe connecting said feed pipe at a point adjacent said chamber with said tank and said return pipe having a cut-off valve therein, whereby heated liquid may be caused to circulate from said tank through said feed and return pipes so as to remove liquid adhering to the interior of said pipes before the heated liquid is allowed to enter the mixing chamber.

10. An apparatus of the character described comprising in combination with a mixer; means for distributively discharging liquid thereinto, said means including a liquid supply tank, a discharge nozzle extending into the mixer, a pump having inlet and outlet pipe connections respectively with said tank and nozzle, a return pipe connection between the pump outlet pipe and tank, a valve in said return pipe, and a valve in said outlet pipe between its point of connection with the return pipe and nozzle.

11. An apparatus of the character described comprising in combination with a mixer; means for distributively discharging liquid thereinto, said means including a liquid supply tank, a discharge nozzle extending into the top of the mixer, a pump having inlet and outlet pipe connections respectively with said tank and nozzle, a primary return pipe connection between the pump outlet pipe and tank, a secondary return pipe connection also between said outlet pipe and tank but from a point further removed from the pump, a valve in said primary return pipe, a valve in said secondary return pipe, and a valve in said outlet pipe between the latter's point of connection with the secondary return pipe and said nozzle.

12. An apparatus of the character described comprising in combination with a mixer; means for distributively discharging liquid thereinto, said means including a liquid supply tank, a discharge nozzle extending into the mixer, a pump having inlet and outlet pipe connections respectively with said tank and nozzle, a valve in said pump outlet pipe adjacent its connection with the nozzle, a primary return pipe connection between said outlet pipe and tank from a point in the former adjacent the pump, a valve in said primary return pipe, a relief valve opening into said tank and connecting with said primary return pipe in advance of the valve therein, a secondary return pipe connection also between said outlet pipe and tank but from a point in advance of the valve in the outlet pipe, and a valve in said secondary return pipe.

13. An apparatus of the character described comprising in combination with a mixer; means for distributively discharging liquid thereinto, said means including a liquid supply tank, a discharge nozzle extending into the mixer, a pump having inlet and outlet pipe connections respectively with said tank and nozzle, a valve in said pump outlet pipe adjacent the latter's connection with the nozzle, an automatic relief valve with pipe connections between said outlet pipe and tank from a point in the former adjacent the pump, a return pipe connection between said outlet pipe and tank but from a point in the former in advance of the valve therein, and a valve in said return pipe.

14. An apparatus of the character described comprising in combination with a mixer; means for distributively discharging liquid thereinto, said means including a liquid supply tank, means for heating the liquid in said tank, a discharge nozzle extending into the mixer, a pump having inlet and outlet pipe connections respectively with said tank and nozzle, a return pipe connection between the pump outlet pipe and tank, a valve in said return pipe, and a valve in said outlet pipe between its point of connection with the return pipe and nozzle.

15. An apparatus of the character described comprising in combination with a mixer; means for distributively discharging liquid thereinto, said means including a liquid supply tank, means for heating liquid in said tank, a discharge nozzle extending into the mixer, a pump having inlet and outlet pipe connections respectively with said tank and nozzle, a valve in said pump outlet pipe adjacent its connection with the nozzle, another valve in said pump outlet pipe between the first mentioned valve and pump, a primary return pipe connection between said outlet pipe and tank from a point in the former adjacent the pump, a valve in said primary return pipe, a relief valve opening into said tank and connecting with said primary return pipe in advance of the valve therein, a secondary return pipe connection also between said outlet pipe and tank but from a point in advance of the first mentioned valve therein, and a valve in said secondary return pipe.

16. An apparatus according to the preceding claim wherein the pump outlet pipe includes a gage meter for recording the quantity of liquid forced therethrough by the pump.

17. An apparatus of the character described comprising in combination with a mixer; means for distributively discharging liquid thereinto, said means including a liquid supply tank, means for heating liquid in said tank, a discharge nozzle extending into the mixer, a pump having inlet and outlet pipe connections respectively with said tank and nozzle, a valve in said pump outlet pipe adjacent its connection with the nozzle, another valve in said pump outlet pipe between the first mentioned valve and pump, a primary return pipe connection between said outlet pipe and tank from a point in the former adjacent the pump, a valve in said primary return pipe, a relief valve opening into said tank and connecting with said primary return pipe in advance of the valve therein, a secondary return pipe connection also between said outlet pipe and tank but from a point in advance of the first mentioned valve therein, and a valve in said secondary return pipe; whereby heated liquid may be caused to circulate in advance stages through the pump outlet and return pipes for removing cold molasses therein adhering before introducing the heated liquid through the nozzle into the mixer.

18. An apparatus of the character described for supplying liquid to a mixing chamber, comprising a liquid supply tank, a pump, a pipe connecting the inlet of the pump with the tank, a pipe extending from the outlet of the pump and opening into the mixing chamber, a return pipe connection between the pump outlet pipe and tank, a valve in said return pipe and a valve in said outlet pipe beyond its point of connection with the return pipe.

19. An apparatus of the character described for supplying liquid to a mixing chamber, comprising a liquid supply tank, a pump, a pipe connecting the inlet of the pump with the tank, a pipe extending from the outlet of pump and opening into the mixing chamber, a primary return pipe connection between the pump outlet pipe and tank, a secondary return pipe connection also between said outlet pipe and tank but from a point further removed from the pump, a valve in said primary return pipe, a valve in said secondary return pipe, and a valve in said outlet pipe beyond the latter's point of connection with the secondary return pipe.

20. An apparatus of the character described for supplying liquid to a mixing chamber, comprising a liquid supply tank, a pump, a pipe connecting the inlet of the pump with the tank, a pipe extending from the outlet of the pump and opening into the mixing chamber, a primary return pipe connection between the pump outlet pipe and tank, a valve in said primary return pipe, a relief valve opening into said tank and connected with said primary return pipe in advance of the aforesaid valve therein, a secondary return pipe connection also between said outlet pipe and tank but from a point beyond the primary return pipe's connection therewith, a valve in said secondary return pipe, and a valve in said outlet pipe beyond the latter's point of connection with the secondary return pipe.

21. An apparatus according to the preceding claim, wherein the pump outlet pipe includes a gage meter for recording the quantity of liquid forced therethrough by the pump.

In testimony whereof I hereby affix my signature.

LIONEL TRUE.